United States Patent
Lin

(10) Patent No.: US 11,283,552 B2
(45) Date of Patent: Mar. 22, 2022

(54) FEEDBACK INFORMATION TRANSMISSION METHOD AND APPARATUS AND COMMUNICATIONS DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/039,756

(22) Filed: Sep. 30, 2020

(65) Prior Publication Data

US 2021/0021384 A1 Jan. 21, 2021

Related U.S. Application Data

(63) Continuation of application No. PCT/CN2018/102028, filed on Aug. 23, 2018.

(51) Int. Cl.
*H04L 1/18* (2006.01)
*H04W 16/14* (2009.01)

(52) U.S. Cl.
CPC ......... *H04L 1/1812* (2013.01); *H04W 16/14* (2013.01)

(58) Field of Classification Search
CPC ............. H04W 72/1268; H04W 8/24; H04W 72/0446; H04W 72/1289; H04W 1/1845; H04W 16/14; H04L 1/1812; H04L 1/1816; H04L 1/1819; H04L 1/1861; H04L 1/10643; H04L 1/00; H04L 5/0055; H04L 1/1614; H04L 1/1854; H04L 1/1864
See application file for complete search history.

(56) References Cited

U.S. PATENT DOCUMENTS

| 6,574,668 B1 | 6/2003 | Gubbi et al. |
| 2017/0207895 A1 | 7/2017 | Yang et al. |

(Continued)

FOREIGN PATENT DOCUMENTS

| CN | 105978671 | 9/2016 |
| CN | 105991179 | 10/2016 |

(Continued)

OTHER PUBLICATIONS

WIPO, ISR and WO for PCT/CN2018/102028, dated May 22, 2019.
Guangdong Oppo Mobile Telecom, "Discussion on HARQ-ACK feedback for CBG-based transmission," 3GPP TSG RAN WG1 NR Ad-Hoc#2, R1-1710169, Jun. 2017, 3 pages.
Oppo, "DCI composition for CBG based retransmission," 3GPP TSG RAN WG1 Meeting #91, R1-1719994, Dec. 2017, 3 pages.

(Continued)

*Primary Examiner* — Hanh N Nguyen
(74) *Attorney, Agent, or Firm* — Hodgson Russ LLP

(57) ABSTRACT

Embodiments of this application provide a feedback information transmission method and apparatus and a communications device. The method includes: receiving, by a first node, a group of target information sent by a second node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources.

12 Claims, 3 Drawing Sheets

---

A first node receives a group of target information sent by a second node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources. — 201

(56) References Cited

U.S. PATENT DOCUMENTS

| | | | |
|---|---|---|---|
| 2018/0123765 | A1 | 5/2018 | Cao et al. |
| 2018/0131474 | A1 | 5/2018 | Berggren et al. |
| 2018/0376496 | A1* | 12/2018 | Wang ................ H04W 72/1289 |
| 2019/0059102 | A1* | 2/2019 | Yerramalli ............ H04L 1/1816 |
| 2019/0141727 | A1* | 5/2019 | Si ....................... H04W 72/1268 |
| 2020/0059327 | A1* | 2/2020 | Kini ...................... H04L 1/1812 |
| 2020/0195386 | A1* | 6/2020 | Marinier ............... H04L 1/1845 |
| 2020/0196333 | A1* | 6/2020 | Lin ......................... H04W 8/24 |
| 2020/0235891 | A1* | 7/2020 | Lei ........................ H04L 1/1822 |

FOREIGN PATENT DOCUMENTS

| | | |
|---|---|---|
| CN | 106888074 | 6/2017 |
| CN | 107027184 | 8/2017 |
| CN | 107347002 | 11/2017 |
| CN | 107359969 | 11/2017 |
| CN | 107733584 | 2/2018 |
| CN | 108011696 | 5/2018 |
| CN | 108023706 | 5/2018 |
| EA | 016380 | 4/2012 |
| RU | 2643486 | 2/2018 |
| WO | 2018082572 | 5/2018 |
| WO | 2018171242 | 9/2018 |

OTHER PUBLICATIONS

Huawei et al., "HARQ operation and feedback indication design for UL grant-free transmission," 3GPP TSG WG1 NR Ad Hoc Meeting, R1-1715575, Sep. 2017, 5 pages.
Samsung, "Group DCI for uplink HARQ-ACK feedback," 3GPP TSG RAN WG1 Meeting #92bis, R1-1804327, Apr. 2018, 8 pages.
EPO, Extended European Search Report for EP Application No. 18931212.7, dated Mar. 26, 2021.
SIPO, First Office Action for CN Application No. 202010413287.6, dated May 26, 2021.
ISDEC, Office Action for CA Application No. 3098094, dated Nov. 1, 2021.
CNIPA, Notification to Grant Patent Right for Invention for CN Application No. 202010413287.6, dated Nov. 29, 2021.
EPO, Communication for EP Application No. 18931212.7, dated Nov. 22, 2021.
Ipi, Office Action for IN Application No. 202017045106, dated Dec. 3, 2021.
FSIP, Office Action for RU Application No. 2020136604/07, dated Dec. 6, 2021.
CNIPA, Second Office Action for CN Application No. 202010413287.6, dated Aug. 16, 2021.

* cited by examiner

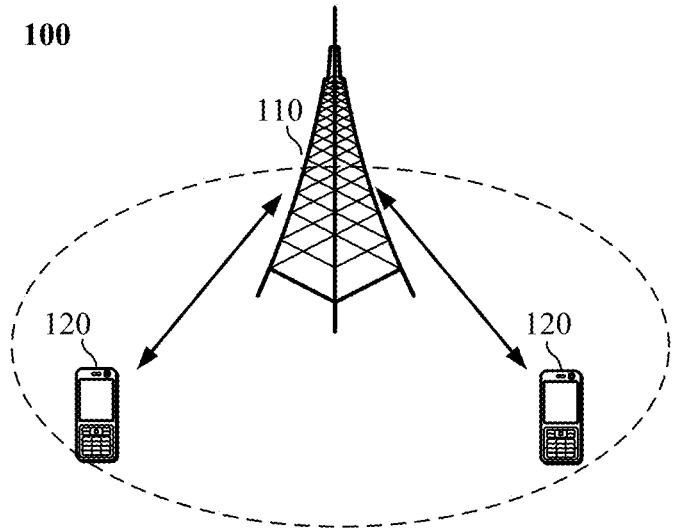

FIG. 1

A first node receives a group of target information sent by a second node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources.

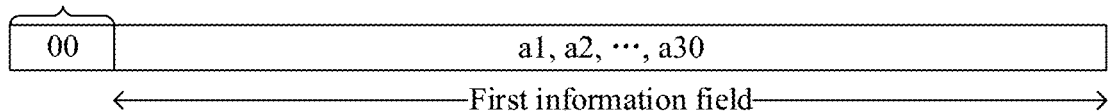

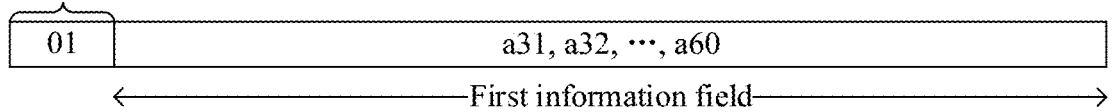

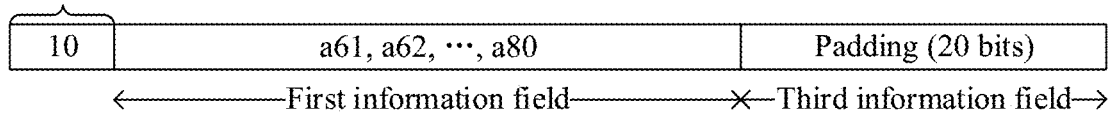

FIG. 3

A second node sends a group of target information to a first node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources. — 401

FIG. 4

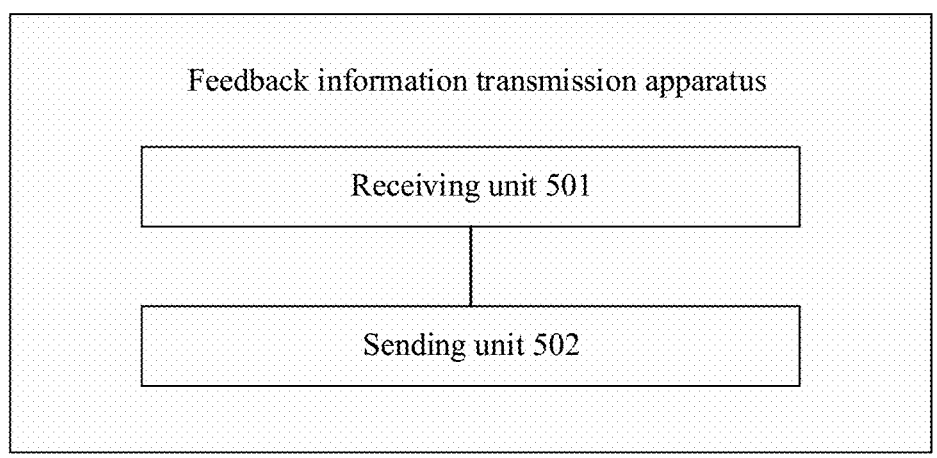

FIG. 5

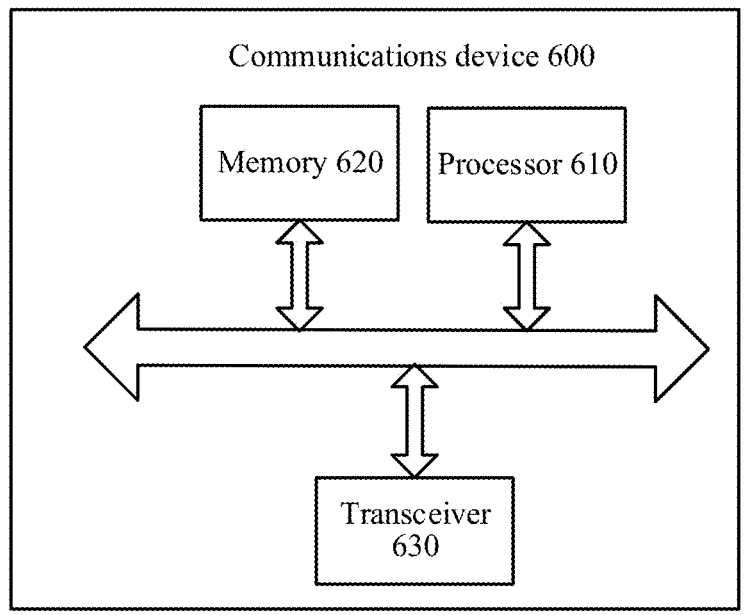

FIG. 6

FEEDBACK INFORMATION TRANSMISSION METHOD AND APPARATUS AND COMMUNICATIONS DEVICE

CROSS-REFERENCE TO RELATED APPLICATION

The present application is a continuation of International Application No. PCT/CN2018/102028, filed Aug. 23, 2018, the entire disclosure of which is incorporated herein by reference.

TECHNICAL FIELD

Embodiments of this application relate to the field of mobile communications technologies, and in particular, to a feedback information transmission method and apparatus and a communications device.

RELATED ART

In grant-free transmission of new radio unlicensed (NR-U), one grant-free transmission may include a plurality of code block groups (CBGs). Therefore, CBG-based retransmission and CBG-based hybrid automatic repeat request-acknowledgment (HARQ-ACK) feedback need to be supported. In downlink HARQ-ACK feedback of FeLAA, CBG-based feedback is not supported. Therefore, a feedback amount of the HARQ-ACK is acceptable, and HARQ-ACK feedback of a full codebook is used. However, in the NR-U, an excessively large feedback amount of the HARQ-ACK, and a new design of an HARQ-ACK codebook needs to be considered.

SUMMARY

Embodiments of this application provide a feedback information transmission method and apparatus and a communications device.

An embodiment of this application provides a feedback information transmission method. The method includes:
receiving, by a first node, a group of target information sent by a second node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources.

An embodiment of this application provides a feedback information transmission apparatus. The apparatus includes:
a receiving unit, configured to receive a group of target information sent by a second node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources.

An embodiment of this application provides a communications device. The communications device includes a processor and a memory. The memory is configured to store a computer program, and the processor is configured to invoke and run the computer program stored in the memory, to perform the foregoing feedback information transmission method.

An embodiment of this application provides a chip, configured to implement the foregoing feedback information transmission method.

Specifically, the chip includes a processor. The processor is configured to invoke and run a computer program from a memory, to enable a device having the chip mounted therein to perform the foregoing feedback information transmission method.

An embodiment of this application provides a computer-readable storage medium, configured to store a computer program. The computer program enables a computer to perform the foregoing feedback information transmission method.

An embodiment of this application provides a computer program product, including a computer program instruction. The computer program instruction enables a computer to perform the foregoing feedback information transmission method.

An embodiment of this application provides a computer program. When run on a computer, the computer program enables the computer to perform the foregoing feedback information transmission method.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the drawings:

FIG. 1 is a schematic diagram of a communications system architecture according to an embodiment of this application;

FIG. 2 is a schematic flowchart 1 of a feedback information transmission method according to an embodiment of this application;

FIG. 3 is a schematic diagram of target information according to an embodiment of this application;

FIG. 4 is a schematic flowchart 2 of a feedback information transmission method according to an embodiment of this application;

FIG. 5 is a schematic structural diagram of a feedback information transmission apparatus according to an embodiment of this application;

FIG. 6 is a schematic structural diagram of a communications device 600 according to an embodiment of this application;

DETAILED DESCRIPTION

Figure 7:
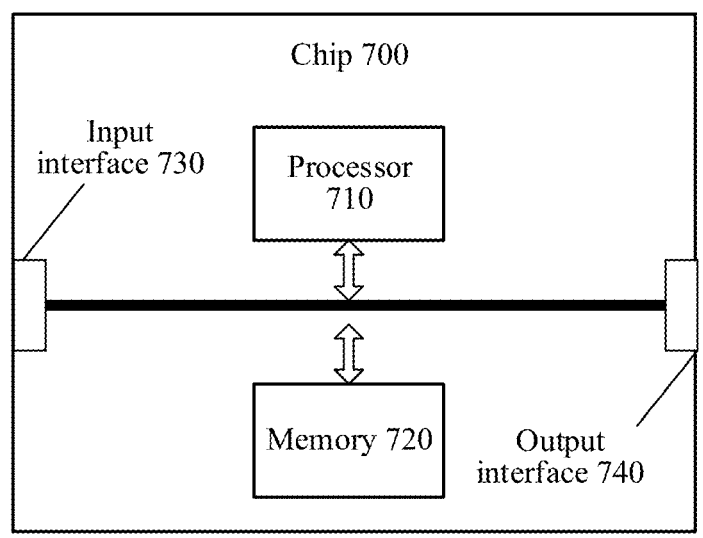
FIG. 7 is a schematic structural diagram of a chip according to an embodiment of this application.

The technical solutions of the embodiments of this application will be described in the following with reference to the accompanying drawings. It is obvious that the embodiments to be described are a part rather than all of the embodiments of this application. All other embodiments obtained by a person of ordinary skill in the art based on the embodiments of this application without creative efforts shall fall within the protection scope of this application.

The technical solutions of the embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), and a worldwide interoperability for microwave access (WiMAX) communications system or 5G system.

For example, FIG. 1 shows a communications system 100 to which an embodiment of this application is applied. The communications system 100 may include a network device 110. The network device 110 may be a device communicating with a terminal device 120 (or referred to as a communications terminal and a terminal). The network device 110 may provide communication coverage for a particular geographical area, and may communicate with a terminal device that is located in the coverage. In at least one embodiment, the network device 110 may be a base transceiver station (BTS) in a GSM system or a CDMA system, or may be a NodeB (NB) in a WCDMA system, or may be an evolved Node B (eNB or eNodeB) in an LTE system or a wireless controller in a cloud radio access network (CRAN), or the network device may be a mobile switching center, a relay station, an access point, an in-vehicle device, a wearable device, a concentrator, a switch, a bridge, a router, a network-side device in a future 5G network, a network device in a future evolved public land mobile network (PLMN) or the like.

The communications system 100 further includes at least one terminal device 120 located within a coverage range of the network device 110. The "terminal device" used herein includes, but is not limited to, a device connected by a wired circuit, for example, a public switched telephone network (PSTN), a digital subscriber line (DSL), a digital cable, a direct cable, and/or another data connection/network; and/or a device connected by a wireless interface such as a cellular network, a wireless local area network (WLAN), a digital television network such as a DVB-H network, a satellite network or an AM-FM broadcast transmitter; and/or an apparatus configured to receive/transmit a communication signal in another terminal device; and/or an Internet of Things (IoT) device. The terminal device, which is configured to perform communication via a wireless interface, may be referred to as "a wireless communications terminal", "a wireless terminal" or "a mobile terminal". An example of the mobile terminal includes, but is not limited to, a satellite or cellular phone, a personal communications system (PCS) terminal that may combine a cellular radio telephone with data processing, fax, and data communication capabilities, a personal digital assistant (PDA) that may include a radio phone, a pager, Internet/intranet access, a web browser, a notebook, a calendar, and/or a global positioning system (GPS) receiver or a conventional laptop and/or handheld receiver or another electronic device including a radio phone transceiver. The terminal device may be an access terminal, user equipment (UE), a user unit, a user station, a mobile site, a mobile station, a remote station, a remote terminal, a mobile device, a user terminal, a terminal, a wireless communications device, a user agent or a user apparatus. The access terminal may be a cellular phone, a cordless phone, a session initiation protocol (SIP) phone, a wireless local loop (WLL) station, a PDA, a handheld device having a wireless communications function, a computing device, another processing device connected to a wireless modem, an in-vehicle device, a wearable device, a terminal device in a future 5G network, a terminal device in a future evolved PLMN or the like.

In at least one embodiment, the terminal devices 120 may perform device to device (D2D) communication with each other.

In at least one embodiment, a 5G system or a 5G network may also be referred to as an NR system or an NR network.

FIG. 1 shows one network device and two terminal devices as an example. In at least one embodiment, the communications system 100 may include a plurality of network devices and the coverage of each network device may include another number of terminal devices. This is not limited in the embodiment of this application.

In at least one embodiment, the communications system 100 may further include other network entities such as a network controller and a mobility management entity (MME). This is not limited in the embodiment of this application.

It should be understood that a device having a communications function in a network/system in the embodiment of this application may be referred to as a communications device. The communications system 100 shown in FIG. 1 is used as an example, the communications device may include a network device 110 and a terminal device 120 that have the communications function. The network device 110 and the terminal device 120 may be a specific device described in the above, and details are not described herein again. The communications device may further include another device, for example, another network entity such as a network controller and an MME in the communications system 100. This is not limited in the embodiment of this application.

It should be understood that, terms "system" and "network" in this specification are usually interchangeably used in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

To facilitate understanding of the technical solutions of the embodiments of this application, the following describes the related art involved in the embodiments of this application.

An unlicensed spectrum is a spectrum allocated for radio device communication in a country and a region. The spectrum is generally considered as a shared spectrum, that is, communications devices in different communications systems may use the spectrum as long as regulatory requirements set by the country or region on the spectrum are met without needing to apply to a government for dedicated spectrum license. To enable each communications system using an unlicensed spectrum for wireless communication to friendly coexist, some countries or regions stipulate regulatory requirements that need to be satisfied during the use of the unlicensed spectrum. For example, in some regions, a communications device follows a "listen before talk" principle, that is, the communications device needs to listen to a channel before transmitting a signal on a channel of an unlicensed spectrum. The communications device can send a signal only when a channel listening result is that the channel is idle. If the channel listening result of the communications device on the channel of the unlicensed spectrum is that the channel is busy, the communications device cannot send a signal.

With the development of wireless communications technologies, it is considered to deploy a network on an unlicensed spectrum in both an LTE system and an NR system, to use the unlicensed spectrum to transmit a data service.

When being applied to an unlicensed spectrum, an LTE system supports autonomous uplink physical uplink shared channel (AUL-PUSCH) transmission of UE. During AUL-PUSCH transmission, the network device semi-statically configures a periodic uplink resource for the terminal device in advance, and uses dynamic signaling to activate and deactivate the semi-statically configured uplink resource. When the semi-statically configured uplink resource is activated, the terminal device may perform autonomous AUL-PUSCH transmission on the uplink resource when there is a transmission requirement of uplink data. After receiving the AUL-PUSCH transmission, the network device performs HARQ-ACK feedback on the AUL-PUSCH. Uplink transmission of the AUL-PUSCH supports up to 16 or 32 HARQ processes (16 processes are supported in single-codeword transmission, and 32 processes are supported in dual-codeword transmission), and downlink HARQ-ACK feedback corresponding to the uplink transmission of the AUL-PUSCH is full codebook feedback.

An NR system being applied to an unlicensed spectrum (NR-U for short) also supports similar autonomous PUSCH transmission of the UE (referred to as Configure Grant-PUSCH (CG-PUSCH) transmission in the NR-U). For the CG-PUSCH transmission in the NR-U, the network device also needs to perform downlink HARQ-ACK feedback on the UE. However, the NR-U system supports a larger carrier transmission bandwidth and a larger subcarrier spacing, a feedback amount that may be required in an uplink transmission opportunity is much greater than a feedback amount in the LTE system (for example, feedback of a CBG needs to be supported in the NR-U), and higher overheads of designing signaling by using the full codebook HARQ-ACK feedback are caused. Therefore, a new codebook designing method is needed.

FIG. 2 is a schematic flowchart 1 of a feedback information transmission method according to an embodiment of this application. As shown in FIG. 2, the feedback information transmission method includes the following steps.

Step 201. A first node receives a group of target information sent by a second node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources.

In the embodiment of this application, there may be two embodiments for the first node and the second node:

(1) the first node is a terminal, and the second node is a base station; or (2) the first node is a base station, and the second node is a terminal.

Herein, the terminal may be any device such as a mobile phone, a tablet computer, an in-vehicle terminal or a notebook that can communicate with a network. The type of the base station such as a gNB in 5G is not limited.

Technical solutions in the embodiments of this application may be applied to an NR-U system, but this application is not limited thereto. In an NR-U system, autonomous PUSCH transmission of UE (referred to as CG-PUSCH in the NR-U) needs to be supported. For the CG-PUSCH transmission in the NR-U, the network device also needs to perform the downlink HARQ-ACK feedback on the UE. Similarly, after the base station sends a downlink transmission resource to the UE, the UE also needs to perform uplink HARQ-ACK feedback to the base station.

In the embodiment of this application, before receiving at least one group of target information sent by the second node, the first node sends a group of data channels to the second node, where the group of data channels corresponds to N bits of feedback information, and N is a positive integer; or sends data to the second node by using at least one transmission resource in a group of transmission resources, where the group of transmission resources corresponds to N bits of feedback information, and N is a positive integer.

It should be noted that values of N corresponding to different groups of data channels may be different or may be the same. The values of N corresponding to different groups of transmission resources may be different or may be the same.

It should be noted that the first node may send one or more groups of data channels/transmission resources to the second node. Each group of data channels/transmission resources in the plurality of groups of data channels/transmission resources may be implemented by using the technical solutions of the embodiment of this application.

For example, a terminal sends a group of uplink data channels to the base station, and the group of uplink data channels corresponds to N bits of feedback information.

For another example, the base station sends data to the terminal by using some or all of transmission resources in a group of downlink transmission resources. The group of downlink transmission resources corresponds to N bits of feedback information.

In the foregoing solution, the group of data channels includes at least one data channel, and the data channel carries at least one TB or at least one CBG. Herein, the type of the data channel may be a PUSCH or a physical downlink shared channel (PDSCH).

In the foregoing solution, the group of transmission resources includes at least one transmission resource, the transmission resource carries at least one physical channel, and the at least one physical channel corresponds to at least one bit of feedback information. Herein, the type of the physical channel may be a PUSCH, a physical downlink control channel (PDCCH) or a PDSCH.

In the embodiment of this application, if the value of M is greater than or equal to the value of N, the first information field includes all information in the N bits of feedback information. If the value of M is less than the value of N, the first information field includes part of information in the N bits of feedback information.

In the embodiment of this application, if the value of M is greater than or equal to the value of N, the group of target information includes one piece of target information. If the value of M is less than the value of N, the group of target information includes P pieces of target information, and P is a positive integer greater than 1. Further, the value of P is configured by a base station, or the value of P is agreed in a protocol, or the value of P is determined according to M and N. For example, P=⌈N/M⌉.

For example, the terminal sends a group of PUSCHs, including 10 PUSCHs, to the base station, and the 10 PUSCHs correspond to 8*10=80 bits of feedback information. It is assumed that the length of one piece of target information is 32 bits, the first two bits of target information is the second information field, and the last 30 bits of target information is the first information field, the base station needs to send a group of target information, including at least three pieces of target information, to the terminal, and the second information field in the three pieces of target information is used for carrying the 80 bits of feedback information.

In the embodiment of this application, if the value of M is less than the value of N, the data channel or the transmission resource corresponding to the feedback information included in each piece of target information in the group of target information is completely different, referring to an application example 1. Alternatively, if the value of M is less than the value of N, some of the data channels or the transmission resources corresponding to the feedback information included in at least two pieces of the group of target information are the same, referring to an application example 2 and an application example 3.

In the embodiment of this application, if the value of M is less than the value of N, the group of target information includes Q pieces of target information, and the second node receives at least one data channel of the data channels corresponding to the feedback information included in the Q pieces of target information, or the second node receives at least one data transmission in the transmission resources corresponding to the feedback information included in the Q pieces of target information.

For example, the base station sends downlink data by using 20 slots, each slot corresponds to one bit of feedback information, and one piece of target information may carry 10 bits of feedback information.

(1) If the terminal receives the downlink data in the slots 1, 2, and 3, the terminal sends a group of target information, including one piece of target information, to the base station, and a second information field in the piece of target information is used for carrying feedback information corresponding to slots 1 to 10.

(2) If the terminal receives the downlink data in the slots 1, 2, 3, 15, and 16, the terminal sends a group of target information, including two pieces of target information, to the base station, and a second information field in the two pieces of target information is used for carrying feedback information corresponding to the 20 slots. For example, the second information field in the first piece of target information is used for carrying feedback information corresponding to the slots 1 to 10, and the second information field in the second piece of target information is used for carrying feedback information corresponding to the slots 11 to 20.

In the embodiment of this application, the value of N is equal to a number of TBs or a number of CBGs included in the group of data channels or the group of transmission resources, or the value of N is equal to a maximum value of a number of TBs or a maximum value of a number of CBGs that can be carried by the group of data channels or the group of transmission resources, or the value of N is pre-configured.

By using the PUSCH as an example, the value of N is equal to a number of TBs or a number of CBGs included in the group of PUSCHs. One bit of feedback information corresponds to one TB or CBG. Herein, for example, the value of N is equal to a number of TBs or a number of CBGs included in a group of PUSCHs. This application is not limited thereto. The value of N may be alternatively greater than the number of TBs or the number of CBGs included in a group of PUSCHs.

By using the PUSCH as an example, the value of N is associated with a number of PUSCHs included in a group of PUSCHs and a maximum number of TBs or a maximum number of CBGs that are carried in one PUSCH. For the transmission of a single TB (that is, one PUSCH carries one TB), N is equal to the number of PUSCHs. For the transmission of a plurality of TBs or a plurality of CBGs, N is equal to the number of PUSCHs multiplied by the maximum number of TBs or the maximum number of CBGs.

In the embodiment of this application, the feedback information is ACK information or NACK information. By using one bit of feedback information as an example, the value of 1 represents the ACK information, and the value of 0 represents the NACK information. Alternatively, the value of 1 represents the NACK information, and the value of 0 represents the ACK information. The ACK information represents that the second node successfully receives the data sent by the first node, and the NACK information represents that the second node fails to receive the data sent by the first node.

Further, in the example of sending a group of data channels to the second node by the first node, the first node receives a group of target information sent by the second node. The group of target information includes a first information field. The first information field includes M bits of feedback information. The M bits of feedback information and M TBs or M CBGs carried in the group of data channels have a one-to-one correspondence. One bit of feedback information corresponds to one TB or CBG, and is used for representing whether the TB or CBG is successfully received by the second node.

Further, in the example of sending a group of transmission resources to the second node by the first node, the first node receives a group of target information sent by the second node, the group of target information includes a first information field, the first information field includes M bits of feedback information, and there is a correspondence between the M bits of feedback information and the group of transmission resources. In an embodiment, there is a correspondence between the M bits of feedback information in the first information field and each time domain transmission unit in the group of transmission resources according to a time domain order. For example, a group of transmission resources includes 10 slots, M=10, the first bit in the first information field corresponds to feedback information of the first slot in the group of transmission resources, and the second bit in the first information field corresponds to feedback information of the second slot in the group of transmission resources. The rest is deduced by analogy. In another embodiment, there is a correspondence between the M bits of feedback information in the first information field and each time-frequency transmission unit in the group of transmission resources according to a frequency domain order and a time domain order. For example, a group of transmission resources includes 9 time-frequency transmission units, M=9, and the 9 time-frequency transmission units are defined according to two dimensions of a time domain and a frequency domain. A carrier 1, a carrier 2, and a carrier 3 are defined in the frequency domain dimension, and a slot 1, a slot 2, and a slot 3 are defined in the time domain dimension. In this way, the first bit in the first information field corresponds to feedback information of a video transmission unit corresponding to the carrier 1 and the slot 1 in the group of transmission resources, the second bit in the first information field corresponds to feedback information of a video transmission unit corresponding to the carrier 1 and the slot 2 in the group of transmission resources, and the third bit in the first information field corresponds to feedback information of a video transmission unit corresponding to the carrier 1 and the slot 3 in the group of transmission resources. The rest is deduced by analogy. The correspondence is a first frequency domain order before a time domain order.

In the embodiment of this application, that the second information field is used for determining a correspondence between the first information field and the group of data channels may be implemented in the following manners.

(1) The second information field is used for indicating an index value of the target information in which the second information field is located in the group of target information, and there is a correspondence between the group of target information and the group of data channels or the group of transmission resources.

For example, a table may be preset, and the table includes a correspondence between a group of target information and a group of data channels or a group of transmission resources, for example, correspondences between P pieces of target information and P data channels or P transmission resources. One corresponding data channel or one corresponding transmission resource is determined in the table according to the index value of the target information in the second information field.

(2) There is a correspondence between the value of the second information field and a parameter of a group of data channels or a parameter of a group of transmission resources. Further, the parameter of the group of data channels or the parameter of the group of transmission resources includes at least one of the following parameters:

a HARQ process number;

a data channel index number or a transmission resource index number;

a TB index number in the data channel or the transmission resource; and a CBG index number in the data channel or the transmission resource.

In the foregoing solutions, there is a correspondence between the M bits of feedback information in the first information field and the transmission resource index number, and the transmission resource index number includes a time domain index number and/or a frequency domain index number.

For example, the first information field includes 4 bits of feedback information, and corresponding index numbers of a group of transmission resources from left to right are a slot 1, a slot 2, a slot 3, and a slot 4.

For another example, the first information field includes 4 bits of feedback information, and corresponding index numbers of a group of transmission resources from left to right are [a carrier 1, a slot 1], [a carrier 1, a slot 2], [a carrier 2, a slot 1], and [a carrier 2, a slot 2].

In the foregoing solutions, that there is a correspondence between the value of the second information field and a parameter of a group of data channels may be implemented in the following manners.

(1) The second information field includes a starting number corresponding to the parameter, or the second information field includes a starting number and an ending number corresponding to the parameter.

(2) There is a correspondence between the value of the second information field and the parameter, and the correspondence between the value of the second information field and the parameter is agreed in the protocol or configured by the base station.

(3) The second information field includes at least one number corresponding to the parameter, and there is a correspondence between each number in the at least one number and a part of the first information field.

In the embodiment of this application, a number of bits included in the second information field is a fixed value. In the embodiment of this application, the number of bits included in the second information field is configured by the base station.

In the embodiment of this application, the number of bits included in the second information field is determined based on at least one of the following parameters:

a maximum number of HARQ processes;

a maximum number of HARQ processes configured for a terminal;

a maximum number, configured for the terminal, of TBs included in one data channel;

a maximum number, configured for the terminal, of CBGs included in one data channel;

a number of aggregation carriers;

a number of band width parts (BWPs) of which simultaneous activation is supported by the terminal;

a maximum channel occupation time (MCOT) length; and a channel occupation time (COT) length carrying the group of data channels.

Further, the group of target information further includes a third information field, and the third information field includes a padding bit.

In the foregoing solutions of the embodiment of this application, one transmission resource is one slot, or one transmission resource is one slot in one carrier, or one transmission resource is one slot in one BWP.

In a specific scenario, when the first node is a terminal, and the second node is a base station, the group of target information is transmitted by using a downlink control channel. Further, the downlink control channel is located in a target control resource set (CORSET), and the first node receives, in the target CORSET, the at least one group of target information.

The technical solutions of the embodiment of this application are described below with reference to specific application examples, and the following examples are only examples but are not used to limit the technical solutions of the embodiment of this application.

Application Example 1

The terminal transmits a PUSCH in a CBG manner, and the PUSCH includes up to 8 CBGs. After continuously sending 10 PUSCHs to the base station, the terminal expects the base station to send 8*10=80 bits of ACK/NACK information. To avoid an increase in PDCCH blind detection, the size of downlink control information (DCI) is restricted. For example, it is agreed that the size of DCI is 32 bits. One piece of DCI represents one piece of target information. The 32 bits of the piece of DCI are divided into two parts, that is, a first information field and a second information field. The length of the second information field is 2 bits, and the length of the first information field is 30 bits.

Referring to FIG. 3, the terminal expects to receive three pieces of DCI, that is, DCI 1, DCI 2, and DCI 3. An index value corresponding to a second information field in the DCI 1 is 00, and the carried 30 bits of ACK/NACK information is $1^{st}$ to $30^{th}$ bits in the 80 bits. An index value in the DCI 2 is 01, and the carried 30 bits of ACK/NACK information is $31^{st}$ to $60^{th}$ bits in the 80 bits. An index value in the DCI 3 is 10, and the carried 30 bits of ACK/NACK information is $61^{st}$ to $80^{th}$ bits in the 80 bits. In addition, to ensure that the size of the DCI is constant, 20 bits of padding information are further padded to the DCI 3.

Application Example 2

The terminal supports up to 32 HARQ processes during transmission of a PUSCH. Referring to Table 1, there are the following correspondences between the value of the second information field and the HARQ process number carried in the DCI:

If process numbers corresponding to a group of PUSCHs sent by the terminal are 1 to 8, the terminal receives DCI, and the value of the second information field is 00. The first information field includes 8 bits of feedback information and 2 bits of padding information, and the process numbers corresponding to the 8 bits of feedback information are 1 to 8.

If process numbers corresponding to a group of PUSCHs sent by the terminal are 1 to 16, the terminal receives at least two pieces of DCI, and the value of the second information field of the DCI 1 is 00. The first information field of the DCI 1 includes 10 bits of feedback information, and the process numbers corresponding to the 10 bits of feedback information are 1 to 10. The value of the second information field of the DCI 2 is 01. The first information field of the DCI 2 includes 6 bits of feedback information and 4 bits of padding information, and the process numbers corresponding to the 6 bits of feedback information are 11 to 16.

TABLE 1

| Value of a second information field | HARQ process number corresponding to ACK/NACK information carried by a first information field |
| --- | --- |
| 00 | Processes 1 to 10 |
| 01 | Processes 8 to 17 |
| 10 | Processes 15 to 24 |
| 11 | Processes 23 to 32 |

Application Example 3

The terminal supports up to 32 TBs/CBGs during transmission of a PUSCH. Referring to Table 2, there are the following correspondences between the value of the second information field and a PUSCH/TB/CBG number:

If the PUSCH/TB/CBG numbers corresponding to a group of PUSCHs sent by the terminal are 1 to 8, the terminal receives DCI, and the value of the second information field is 00. The first information field includes 8 bits of feedback information and 2 bits of padding information, and PUSCH/TB/CBG numbers corresponding to the 8 bits of feedback information are 1 to 8.

If the PUSCH/TB/CBG numbers corresponding to a group of PUSCHs sent by the terminal are 1 to 16, the terminal receives at least two pieces of DCI, and the value of the second information field of the DCI 1 is 00. The first information field of the DCI 1 includes 10 bits of feedback information, and PUSCH/TB/CBG numbers corresponding to the 10 bits of feedback information are 1 to 10. The value of the second information field of the DCI 2 is 01. The first information field of the DCI 2 includes 6 bits of feedback information and 4 bits of padding information, and the PUSCH/TB/CBG numbers corresponding to the 6 bits of feedback information are 11 to 16.

TABLE 2

| Value of a second information field | PUSCH/TB/CBG number corresponding to ACK/NACK information carried by a first information field |
| --- | --- |
| 00 | PUSCH/TB/CBG 1 to 10 |
| 01 | PUSCH/TB/CBG 8 to 17 |
| 10 | PUSCH/TB/CBG 15 to 24 |
| 11 | PUSCH/TB/CBG 23 to 32 |

FIG. 4 is a schematic flowchart 2 of a feedback information transmission method according to an embodiment of this application. As shown in FIG. 4, the feedback information transmission method includes the following steps:

Step 401. A second node sends a group of target information to a first node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources.

In the embodiment of this application, there may be two embodiments for the first node and the second node:

(1) the first node is a terminal, and the second node is a base station; or (2) the first node is a base station, and the second node is a terminal.

Herein, the terminal may be any device such as a mobile phone, a tablet computer, an in-vehicle terminal or a notebook that can communicate with a network. The type of the base station such as a gNB in 5G is not limited.

Technical solutions in the embodiments of this application may be applied to an NR-U system, but this application is not limited thereto. In an NR-U system, autonomous PUSCH transmission of UE (referred to as CG-PUSCH in the NR-U) needs to be supported. For the CG-PUSCH transmission in the NR-U, the network device also needs to perform the downlink HARQ-ACK feedback on the UE. Similarly, after the base station sends a downlink transmission resource to the UE, the UE also needs to perform uplink HARQ-ACK feedback to the base station.

The technical solution of the embodiment may be understood with reference to the feedback information transmission method shown in FIG. 4. Content in the feedback information transmission method shown in FIG. 4 may be used for explaining the technical solutions of the embodiment, and details are not described herein again.

FIG. 5 is a schematic structural diagram of a feedback information transmission apparatus according to an embodiment of this application. As shown in FIG. 5, the apparatus includes a receiving unit 501 and a sending unit 502.

In an embodiment, the receiving unit 501 is configured to receive a group of target information sent by a second node. Each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources. The sending unit 502 is configured to: send a group of data channels to the second node, where the group of data channels corresponds to N bits of feedback information, and N is a positive integer; or send data to the second node by using at least one transmission resource in a group of transmission resources, where the group of transmission resources corresponds to N bits of feedback information, and N is a positive integer.

In another embodiment, the sending unit 502 is configured to send a group of target information to a first node, where each piece of target information in the group of target information includes a first information field and a second information field, the first information field includes M bits of feedback information for a group of data channels or a group of transmission resources, M is a positive integer, and the second information field is used for determining a correspondence between the first information field and the group of data channels or the group of transmission resources. The receiving unit 501 is configured to: receive a group of data channels sent by the first node, where the group of data channels corresponds to N bits of feedback information, and N is a positive integer; or receive data sent by the first node by using at least one transmission resource in a group of transmission resources, where the group of transmission resources corresponds to N bits of feedback information, and N is a positive integer.

In an embodiment, if the value of M is greater than or equal to the value of N, the first information field includes all information in the N bits of feedback information. Alternatively, if the value of M is less than the value of N, the first information field includes part of information in the N bits of feedback information.

In an embodiment, if the value of M is greater than or equal to the value of N, the group of target information includes one piece of target information. Alternatively, if the value of M is less than the value of N, the group of target information includes P pieces of target information, and P is a positive integer greater than 1. Further, the value of P is configured by a base station, or the value of P is agreed in a protocol, or the value of P is determined according to M and N.

In an embodiment, if the value of M is less than the value of N, the group of target information includes Q pieces of target information, and the second node receives at least one data channel of the data channels corresponding to the feedback information included in the Q pieces of target information, or the second node receives at least one data transmission in the transmission resources corresponding to the feedback information included in the Q pieces of target information.

In an embodiment, if the value of M is less than the value of N, the data channel or the transmission resource corresponding to the feedback information included in each piece of target information in the group of target information is completely different. Alternatively, if the value of M is less than the value of N, some of the data channels or the transmission resources corresponding to the feedback information included in at least two pieces of the group of target information are the same.

In an embodiment, the value of N is equal to a number of TBs or a number of CBGs included in the group of data channels or the group of transmission resources; or the value of N is equal to a maximum value of a number of TBs or a maximum value of a number of CBGs that can be carried in the group of data channels or the group of transmission resources; or the value of N is pre-configured.

In an embodiment, the group of data channels includes at least one data channel, and the data channel carries at least one TB or at least one CBG.

In an embodiment, the group of transmission resources includes at least one transmission resource, the transmission resource carries at least one physical channel, and the at least one physical channel corresponds to at least one bit of feedback information.

In an embodiment, that the second information field is used for determining a correspondence between the first information field and the group of data channels or the group of transmission resources includes:

the second information field is used for indicating an index value of the target information in which the second information field is located in the group of target information, and there is a correspondence between the group of target information and the group of data channels or the group of transmission resources.

In an embodiment, that the second information field is used for determining a correspondence between the first information field and the group of data channels or the group of transmission resources includes:

there is a correspondence between the value of the second information field and a parameter of the group of data channels or a parameter of the group of transmission resources.

In an embodiment, the parameter of the group of data channels or the parameter of the group of transmission resources includes at least one of the following parameters:

a HARQ process number;

a data channel index number or a transmission resource index number;

a TB index number in the data channel or the transmission resource; and a CBG index number in the data channel or the transmission resource.

In an embodiment, there is a correspondence between the M bits of feedback information in the first information field and the transmission resource index number, and the transmission resource index number includes a time domain index number and/or a frequency domain index number.

In an embodiment, that there is a correspondence between the value of the second information field and a parameter of the group of data channels includes:

the second information field includes a starting number corresponding to the parameter; or the second information field includes a starting number and an ending number corresponding to the parameter.

In an embodiment, that there is a correspondence between the value of the second information field and a parameter of the group of data channels includes:

there is a correspondence between the value of the second information field and the parameter, and the correspondence between the value of the second information field and the parameter is agreed in the protocol or configured by the base station.

In an embodiment, that there is a correspondence between the value of the second information field and a parameter of the group of data channels includes:

the second information field includes at least one number corresponding to the parameter, and there is a correspondence between each number in the at least one number and a part of the first information field.

In an embodiment, a number of bits included in the second information field is a fixed value.

In an embodiment, the number of bits included in the second information field is configured by the base station.

In an embodiment, the number of bits included in the second information field is determined based on at least one of the following parameters:

a maximum number of HARQ processes;

a maximum number of HARQ processes configured for a terminal;

a maximum number, configured for the terminal, of TBs included in one data channel;

a maximum number, configured for the terminal, of CBGs included in one data channel;

a number of aggregation carriers;

a number of BWPs of which simultaneous activation is supported by the terminal;

an MCOT length; and a COT length carrying the group of data channels.

In an embodiment, the group of target information further includes a third information field, and the third information field includes a padding bit.

In an embodiment, one transmission resource is one slot, or one transmission resource is one slot in one carrier, or one transmission resource is one slot in one BWP.

In an embodiment, the first node is a terminal, and the second node is a base station.

Alternatively, the first node is a base station, and the second node is a terminal.

In an embodiment, when the first node is a terminal, and the second node is a base station, the group of target information is transmitted by using a downlink control channel.

In an embodiment, the downlink control channel is located in a target CORSET, and the receiving unit 501 receives, in the target CORSET, the at least one group of target information.

A person skilled in the art should understand that for related description of the foregoing feedback information transmission apparatus of the embodiment of this application, reference may be made to the related description of the feedback information transmission method of the embodiment of this application for understanding.

FIG. 6 is a schematic structural diagram of a communications device 600 according to an embodiment of this application. The communications device may be a terminal device, or may be a network device. The communications device 600 shown in FIG. 6 includes a processor 610. The processor 610 may invoke a computer program from a memory and run the computer program, to implement the method in the embodiments of this application.

In at least one embodiment, as shown in FIG. 6, the communications device 600 may further include a memory 620. The processor 610 may invoke the computer program from the memory 620 and run the computer program, to implement the method in the embodiments of this application.

The memory 620 may be a component independent of the processor 610, or may be integrated into the processor 610.

In at least one embodiment, as shown in FIG. 6, the communications device 600 may further include a transceiver 630. The processor 610 may control the transceiver 630 to communicate with another device. Specifically, the transceiver 630 may send information or data to the another device, or receive information or data sent by the another device.

The transceiver 630 may include a transmitter and a receiver. The transceiver 630 may further include an antenna, and there may be one or more of antennas.

In at least one embodiment, the communications device 600 may be specifically a network device in the embodiments of this application, and the communications device 600 may implement corresponding procedures implemented by the network device in various methods in the embodiments of this application. For brevity, details are not described herein again.

In at least one embodiment, the communications device 600 may be specifically a mobile terminal/terminal device in the embodiments of this application, and the communications device may implement corresponding procedures implemented by the mobile terminal/terminal device in various methods in the embodiments of this application. For brevity, details are not described herein again.

FIG. 7 is a schematic structural diagram of a chip according to an embodiment of this application. The chip 700 shown in FIG. 7 includes a processor 710. The processor 710 may invoke a computer program from a memory and run the computer program, to implement the method in the embodiments of this application.

In at least one embodiment, as shown in FIG. 7, the chip 700 may further include a memory 720. The processor 710 may invoke the computer program from the memory 720 and run the computer program, to implement the method in the embodiments of this application.

The memory 720 may be a component independent of the processor 710, or may be integrated into the processor 710.

In at least one embodiment, the chip 700 may further include an input interface 730. The processor 710 may control the input interface 730 to communicate with another device or chip. Specifically, the input interface 730 may obtain information or data sent by the another device or chip.

In at least one embodiment, the chip 700 may further include an output interface 740. The processor 710 may control the output interface 740 to communicate with another device or chip. Specifically, the output interface 740 may output information or data to the another device or chip.

In at least one embodiment, the chip may be applied to the network device in the embodiments of this application, and the chip may implement corresponding procedures implemented by the network device in various methods in the embodiments of this application. For brevity, details are not described herein again.

In at least one embodiment, the chip may be applied to the mobile terminal/terminal device in the embodiments of this application, and the chip can implement corresponding procedures implemented by the mobile terminal/terminal device in various methods in the embodiments of this application. For brevity, details are not described herein again.

It should be noted that, the chip mentioned in the embodiments of this application may also be referred to as a system-level chip, a system chip, a chip system, a system on chip or the like.

Figure 8:
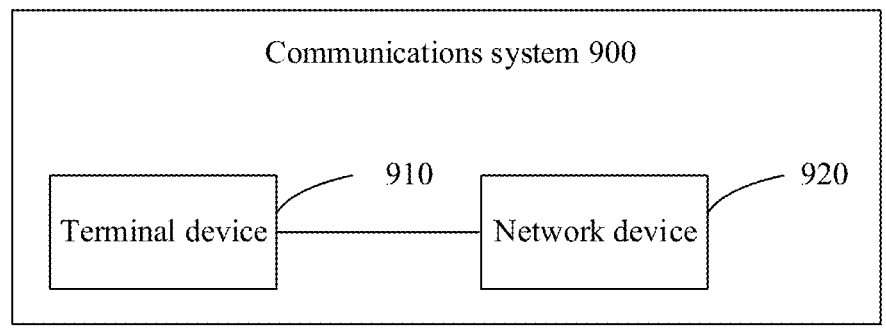
FIG. 8 is a schematic block diagram of a communications system 900 according to an embodiment of this application.

FIG. 8 is a schematic block diagram of a communications system 900 according to an embodiment of this application. As shown in FIG. 8, the communications system 900 includes a terminal device 910 and a network device 920.

The terminal device 910 may be configured to implement corresponding functions implemented by the terminal device in the foregoing method, and the network device 920 may be configured to implement corresponding functions implemented by the network device in the foregoing method. For brevity, details are not described herein again.

It should be understood that, the processor of the embodiment of this application may be an integrated circuit chip, and has a signal processing capability. In an embodiment process, steps in the foregoing method embodiments may be completed by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The methods, the steps, and logical block diagrams that are disclosed in the embodiments of this application may be implemented or performed. The general-purpose processor may be a microprocessor or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. The software modules may be located in a mature storage medium in the field, for example, a random access memory (RAM), a flash memory, a read-only memory (ROM), a programmable ROM (PROM), an electrically erasable programmable memory or a register. The storage medium is located in the memory, and the processor reads information in the memory and completes the steps in the foregoing methods in combination with hardware thereof.

It may be understood that the memory in the embodiments of this application may be a volatile memory or a nonvolatile memory, or may include a volatile memory and a nonvolatile memory. The non-volatile memory may be a ROM, a PROM, an erasable PROM (EPROM), an electrically EPROM (EEPROM) or a flash memory. The volatile memory may be a RAM, and is used as an external cache. It is described as an example but not a limitation, many forms of RAMs, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM), may be used. It should be noted that, the memory of the system and the method described in this specification includes, but is not limited to, these and any other suitable types of memories.

It should be understood that, the memory is an example but is not intended for limitation. For example, the memory in the embodiments of this application may be alternatively an SRAM, a DRAM, a SDRAM, a DDR SDRAM, an ESDRAM, a SLDRAM, a DR RAM and the like. That is, the memory in the embodiment of this application aims to include but is not limited to these memories and any other suitable type of memory.

An embodiment of this application further provides a computer-readable storage medium. The medium stores a computer program.

In at least one embodiment, the computer-readable storage medium may be applied to a network device in the embodiments of this application, and the computer program may implement corresponding procedures implemented by the network device in various methods in the embodiments of this application. For brevity, details are not described herein again.

In at least one embodiment, the computer-readable storage medium may be applied to a mobile terminal/terminal device in the embodiments of this application, and the computer program enables a computer to perform corresponding procedures implemented by the mobile terminal/terminal device in various methods in the embodiments of this application. For brevity, details are not described herein again.

An embodiment of this application further provides a computer program product, including a computer program instruction.

In at least one embodiment, the computer program product may be applied to a network device in the embodiments of this application, and the computer program instruction enables a computer to perform corresponding procedures implemented by the network device in various methods in the embodiments of this application. For brevity, details are not described herein again.

In at least one embodiment, the computer program product may be applied to a mobile terminal/terminal device in the embodiments of this application, and the computer program instruction enables a computer to perform corresponding procedures implemented by the mobile terminal/terminal device in various methods in the embodiments of this application. For brevity, details are not described herein again.

An embodiment of this application further provides a computer program.

In at least one embodiment, the computer program may be applied to a network device in the embodiments of this application, and the computer program, when run on a computer, enables the computer to perform corresponding procedures implemented by the network device in various methods in the embodiments of this application. For brevity, details are not described herein again.

In at least one embodiment, the computer program may be applied to a mobile terminal/terminal device in the embodiments of this application, and the computer program, when run on a computer, enables the computer to perform corresponding procedures implemented by the mobile terminal/terminal device in various methods in the embodiments of this application. For brevity, details are not described herein again.

A person of ordinary skill in the art may be aware that, in combination with the examples described in the embodiments disclosed in this specification, units and algorithm steps may be implemented by using electronic hardware or a combination of computer software and the electronic hardware. Whether the functions are executed by hardware or software depends on particular applications and design constraint conditions of the technical solutions. A person skilled in the art may use different methods to implement the described functions for each particular application, but it should not be considered that the embodiment falls outside the scope of the present application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division in an actual embodiment. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electrical, mechanical, or other forms.

The units described as separate parts may or may not be physically separate, and parts displayed as units may or may not be physical units, that is, may be located in one position or may be distributed on a plurality of network units. Some or all of the units may be chosen according to actual needs to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device or the like) to perform all or some of the steps of the methods described in the embodiments of this application. The foregoing storage medium includes: any medium that can store program codes, such as a USB flash disk, a removable hard disk, a read-only memory (ROM), a RAM, a magnetic disk, or an optical disk.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for feedback information transmission, comprising:
    transmitting, by User Equipment (UE), a group of target information, wherein:
        each piece of target information in the group of target information comprises a first information field and a second information field,
        the first information field comprises M bits of feedback information for a group of hybrid automatic repeat request (HARQ) processes comprising at least one HARQ process,
        the second information field indicates the group of HARQ processes, M is a positive integer, and
        a number of bits contained in the second information field is determined based on a maximum number of HARQ processes configured for the UE.

2. The method according to claim 1, wherein that the second information field indicates the group of HARQ processes comprises:
    a value of the second information field corresponds to the group of HARQ processes.

3. The method according to claim 2, wherein the value of the second information field indicates a hybrid automatic repeat request (HARQ) process number of the group of HARQ processes.

4. The method according to claim 2, wherein a correspondence between the value of the second information field and the group of HARQ processes is agreed in the protocol.

5. A feedback information transmission apparatus, applied to User Equipment (UE), and comprising:
    a transmitting unit, configured to transmit a group of target information, wherein:
        each piece of target information in the group of target information comprises a first information field and a second information field,
        the first information field comprises M bits of feedback information for a group of hybrid automatic repeat request (HARQ) processes comprising at least one HARQ process,
        the second information field indicates the group of HARQ processes, M is a positive integer, and
        a number of bits contained in the second information field is determined based on a maximum number of HARQ processes configured for the UE.

6. The apparatus according to claim 5, wherein that the second information field indicates the group of HARQ processes comprises:
    a value of the second information field corresponds to the group of HARQ processes.

7. The apparatus according to claim 6, wherein the value of the second information field indicates a hybrid automatic repeat request (HARQ) process number of the group of HARQ processes.

8. The apparatus according to claim 6, wherein a correspondence between the value of the second information field and the group of HARQ processes is agreed in the protocol.

9. A network device, comprising:
    a processor;
    a memory configured to store a computer program executable by the processor; and
    a transceiver configured to receive a group of target information sent by User Equipment (UE), wherein:
        each piece of target information in the group of target information comprises a first information field and a second information field,
        the first information field comprises M bits of feedback information for a group of hybrid automatic repeat request (HARQ) processes comprising at least one HARQ process,
        the second information field indicates the group of HARQ processes, M is a positive integer, and
        a number of bits contained in the second information field is determined based on a maximum number of HARQ processes configured for the UE.

10. The network device according to claim 9, wherein that the second information field indicates the group of HARQ processes comprises:
    a value of the second information field corresponds to the group of HARQ processes.

11. The network device according to claim 10, wherein the value of the second information field indicates a HARQ process number of the group of HARQ processes.

12. The network device according to claim 10, wherein a correspondence between the value of the second information field and the group of HARQ processes is agreed in the protocol.

* * * * *